Patented May 8, 1923.

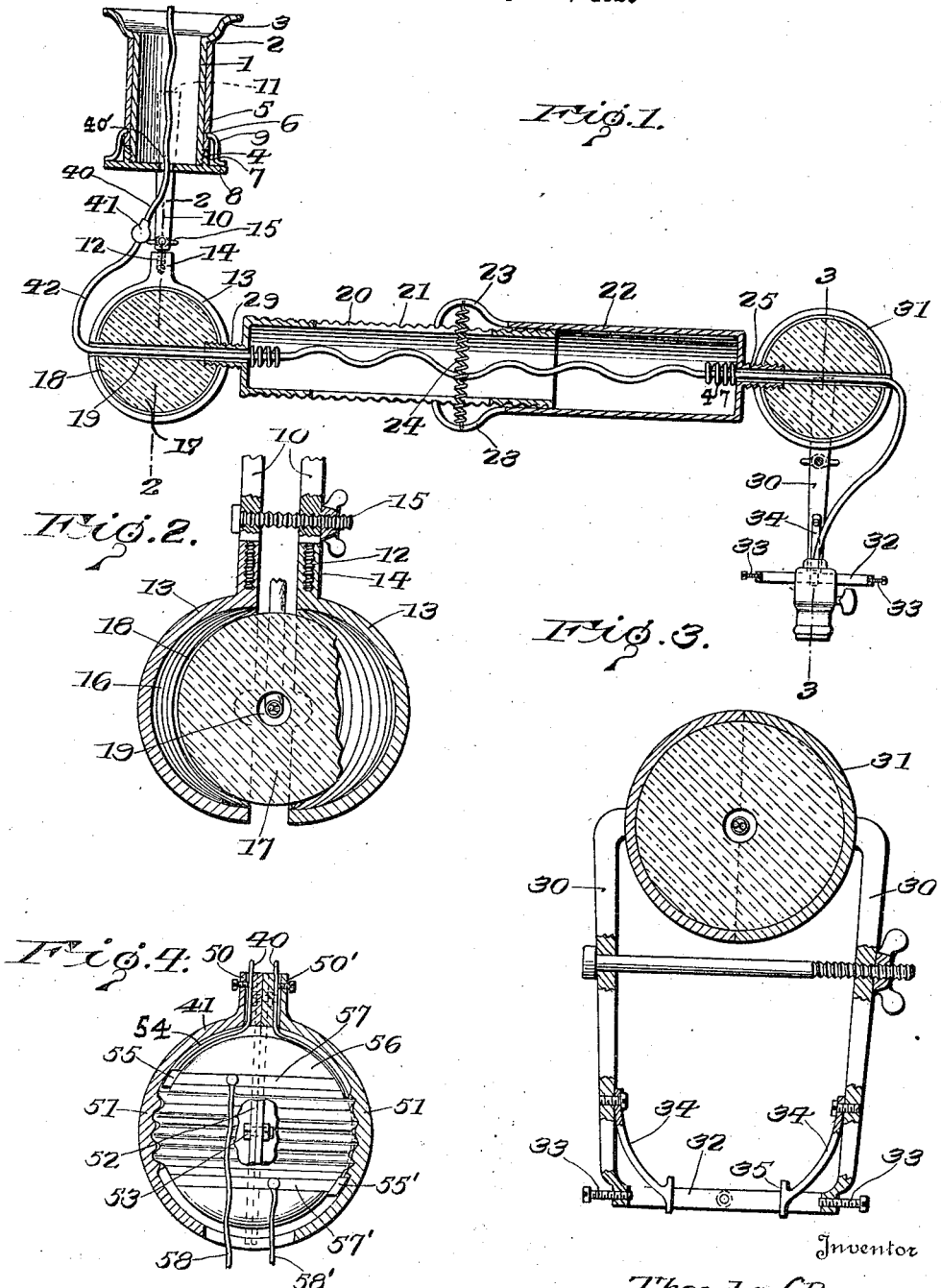

1,454,147

UNITED STATES PATENT OFFICE.

THEODORE GEORGE BERMAN, OF ANTIGO, WISCONSIN.

LIGHT SUPPORT.

Application filed September 8, 1920. Serial No. 408,899.

*To all whom it may concern:*

Be it known that I, THEODORE G. BERMAN, a citizen of the United States, residing at Antigo, in the county of Langlade, State of Wisconsin, have invented certain new and useful Improvements in Light Supports; and I do hereby declare the following to be a full, clear, and exact description of the invention, such as will enable others skilled in the art to which it appertains to make and use the same.

This invention relates to electric light supports, and it includes a hanger, an arm or bracket, the support proper for holding the lamp socket and the shade.

Broadly speaking, the invention lies in the specific construction of the hanger which permits various movements therein, the bracket arm whereby it may be telescoped and the ball-and-socket joints between the hanger and bracket and between the bracket and support.

The invention also contemplates special provision for carrying the cable wires through the several parts so that the former may flex as the latter are adjusted, and includes a swivel in said cable within the hanger and couplings in the cable at other points.

Details of the preferred construction are set forth below. In the drawings herewith:

Figure 1 is a vertical longitudinal central sectional view through the light support.

Figure 2 is an enlarged vertical sectional view through the hanger on the line 2—2 of Figure 1.

Figure 3 is a sectional detail through the ball-and-socket joint at the lower end of the hanger, including the connection of the inner bracket arm with the ball on the line 3—3 of Figure 1.

Figure 4 is an enlarged sectional detail of the swivel coupling.

The hanger is herein shown as adapted to be secured to the ceiling, but it will be understood as the description progresses that it might be secured to a wall so that it would project horizontally therefrom instead of depending vertically from its support as herein shown. It is made up of an inner cylindrical member 1 shouldered at 2 and having above the shoulder a flange 3 which may be screwed or otherwise attached to the support, the lower end of the cylinder being externally threaded as at 4; an outer cylindrical member or sleeve 5 surrounding the inner member 1 with its upper end against said shoulder and its lower end notched as at 6; and a nut 7 screwed onto the threads 4 to hold said two members together, the nut having a flange 8 to which are attached springs 9 whose free ends engage with said notches 6 to hold the outer member 5 after it has been set in the desired position around the inner member 1.

Two bowed legs 10 have their upper ends secured to opposite sides of the sleeve as at 11 and their lower ends turned downward and threaded as at 12, and two cups 13 are provided, each formed with a boss or socket 14 by which it is screwed onto one of said threaded ends; a clamping bolt 15 passing through the two legs and serving when set up tight to draw said cups toward each other. Collectively the latter constitute the outer member of a ball-and-socket joint whose details are best seen in Figures 2 and 4, and internally the cups are ribbed as best seen at 16. The ball 17 of this joint fits within said socket and is externally ribbed as at 18 and provided with a transverse hole 19.

The bracket of this structure includes inner and outer hollow telescopic arms. The inner arm 20 is externally ribbed as at 21 for most of its length and reduced and threaded at one end as at 29 to be screwed into the hole 19. The outer arm 22 is larger than the inner arm so as to move freely over it, and at one end it is provided with a pair of jaws 23 inturned at their tips to engage the ribs or corrugations 21, the tips being drawn normally toward each other by a spring 24. The other end of the outer arm 22 is reduced and threaded as at 25, and engages a hole in the ball of a second ball-and-socket joint whose construction follows that of the joint just described and need not therefore be duplicated.

The support proper comprises a pair of legs 30 whose upper ends are turned inward and connected with sockets 31 in the cups of the last-named joint, and whose lower ends carry a ring 32 having set screws 33 for supporting a shade around the electric light bulb. Connected with said legs are two arms 34 whose lower ends converge and carry a clamp 35 adapted to receive and hold the socket into which said bulb is screwed. Thus it will be seen that the support for the bulb and shade is mounted by a ball-and-socket joint on the outer end of the bracket, and the inner end of the latter is supported by a ball-and-socket joint on the hanger. Obviously the hanger may be attached to the ceiling or to the wall, the bracket will usually project on a substantially horizontal line from the hanger, and the support will usually depend on a substantially vertical line from the bracket. But the hanger has a swivel connection between its two members so that the entire bracket can be swung from side to side. The two joints permit knuckling so that the bracket may be raised and lowered, and the members of the bracket itself are telescopically connected so that the bracket may be lengthened or shortened. Therefore it is possible to move the light and its shade in almost any direction and to a considerable distance within limits, so that the light may be brought to the desired point of use.

The current is supplied through a two-wire cable as usual. This cable leads through the members and the nut of the hanger as indicated at 40', thence through a swivel coupling 41 as therein shown, thence down around the inner joint as at 42, and then extends through the bracket, and this stretch should be of the same length as the bracket when fully distended. Said stretch extends through the reduced outer end of the bracket and the hole in the ball of the second joint and down to the socket supporting the bulb.

There is employed a swivel coupling and the wires 40 lead down into two posts 50 and 50' of this coupling. These posts are mounted at opposite sides of the open upper end of a shell or socket composed of two cups 51 having flanges 52 at their meeting edges connected by bolts 53, and wires 54 are led from said posts within the walls of the cups and connected with metal blocks 55 and 55' which extend into the interior of the socket. Therein is mounted a ball 56 of insulating material having around it upper and lower bands 57 and 57' disposed so as to contact respectively with the blocks 55 and 55' no matter how the ball is turned on its axis. Wires 58 and 58' lead from the respective bands into the ball and downward out its lower end and are connected with the wires of the stretch 42 of cable. The ball may turn freely within the socket, and each band travels in constant contact with its respective block. A swivel coupling of this type inserted at the point indicated at 41 in Figure 1 will, of course, permit the free swiveling movement of the sleeve 5 upon the cylinder 1 of the hanger, because as the lower member of the hanger is revolved around its upper member, the cable 42 must of course revolve around the cable 40 since the latter is connected with the house wiring and cannot turn. While it is true that under ordinary circumstances the bracket arm will be swung from side to side to bring the lamp to the point of use, there may be occasions in which this arm is supported by a hanger from the ceiling at the center of a room, and the bracket and lamp would be revolved completely around the hanger, and the interposition of a swivel at the point 41 would prevent twisting of the cable. The flexibility of the latter will permit all other movements required. Tension springs 47 are provided within the reduced outer end 25 of the bracket to prevent the slipping of the wire therethrough when said bracket is distended.

What is claimed is:

A light support including a pair of swivel members, a tube secured to and extending from one of the swivels and having its outer end open, said open end being formed with a pair of inwardly directed resilient fingers, and a tube secured to the other swivel and extending into the open end of the first tube for slidable adjustment therein, the said second tube being longitudinally slotted in opposite sides and formed with transverse corrugations with which the fingers engage, and a spring disposed transversely of the second tube and through the said slots and being secured to said fingers.

It testimony whereof, I affix my signature, in the presence of two witnesses.

THEODORE GEORGE BERMAN.

Witnesses:
MANDAME DEREMORE,
C. O. BAILEY, Jr.